US009966954B1

(12) United States Patent
Yang et al.

(10) Patent No.: US 9,966,954 B1
(45) Date of Patent: May 8, 2018

(54) PHYSICALLY UNCLONABLE FUNCTION DESIGN

(71) Applicant: The Regents of the University of Michigan, Ann Arbor, MI (US)

(72) Inventors: Kaiyuan Yang, Ann Arbor, MI (US); David Theodore Blaauw, Ann Arbor, MI (US); Dennis Michael Chen Sylvester, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days. days.

(21) Appl. No.: 15/424,630

(22) Filed: Feb. 3, 2017

(51) Int. Cl.
*H04L 9/32* (2006.01)
*H03K 19/003* (2006.01)

(52) U.S. Cl.
CPC ..... *H03K 19/00315* (2013.01); *H04L 9/3271* (2013.01); *H04L 9/3278* (2013.01)

(58) Field of Classification Search
CPC .......................... H03K 19/00315; H03K 19/00
USPC ............................................................ 326/8
See application file for complete search history.

(56) References Cited

U.S. PATENT DOCUMENTS

| 9,018,972 | B1 * | 4/2015 | Gurrieri | H03K 19/003 326/8 |
| 2012/0319724 | A1 * | 12/2012 | Plusquellic | H04L 9/0861 326/8 |
| 2015/0092939 | A1 * | 4/2015 | Gotze | H04L 9/34 380/2 |
| 2017/0017808 | A1 * | 1/2017 | Kwong | G06F 21/73 |
| 2017/0038807 | A1 * | 2/2017 | Bittlestone | G06F 1/26 |
| 2017/0126415 | A1 * | 5/2017 | Deyati | H04L 9/3278 |
| 2017/0141929 | A1 * | 5/2017 | Afghah | H04L 9/3278 |
| 2017/0178710 | A1 * | 6/2017 | Augustine | G11C 11/1695 |
| 2017/0180140 | A1 * | 6/2017 | Mai | H04L 9/3278 |

FOREIGN PATENT DOCUMENTS

WO    WO 2016051370 A1 *   4/2016   ............... G09C 1/00

OTHER PUBLICATIONS

Karpinskyy, et al.; Physically Unclonable Function for Secure Key Generation with a Key Error Rate of 2E-38 in 45nm Smart-Card Chips; 2016 IEEE International Solid-State Circuits Conference (ISSCC); Feb. 2016.
Li, et al.; A 3.07μm2/bitcell Physically Unclonable Function with 3.5% and 1% Bit-Instability Across 0 to 80° C and 0.6 to 1.2V in a 65nm CMOS; 2015 Symposium on VLSI Circuits; Jun. 2015.
Alvarez, et al.; 15fJ/b Static Physically Unclonable Functions for Secure Chip Identification with <2% Native Bit Instability and 140x Inter/Intra PUF Hamming Distance Separation in 65nm; 2015 IEEE International Solid-State Circuits Conference (ISSCC); Feb. 2015.

* cited by examiner

*Primary Examiner* — Dylan White
(74) *Attorney, Agent, or Firm* — Pramudji Law Group PLLC; Ari Pramudji (57) ABSTRACT

Physically Unclonable Function (PUF) cells are described, suitable for CMOS technology, where each PUF cell is based upon a two-transistor amplifier design. A PUF cell includes a voltage generator followed by one or more amplifier stages. Also described is a method and apparatus for determining a dark bit mask for an array of PUF cells based on the two-transistor amplifier design.

20 Claims, 5 Drawing Sheets

PHYSICALLY UNCLONABLE FUNCTION DESIGN

BACKGROUND

A Physically Unclonable Function (PUF) is among the most promising types of security primitives, providing low cost solutions for key storage, chip authentication, supply chain protection, and secure communications. A PUF provides a response to a challenge. For a particular device realizing the PUF, a response-challenge pair depends upon the inherent manufacturing variations in that device. A response-challenge pair is known to the manufacturer of the device and is shared among authorized users, but it is extremely difficult or nearly impossible for an unauthorized user to discover the response-challenge pair by analyzing or reverse engineering the device.

A strong PUF has a large challenge-response space and a weak PUF has a relatively small challenge-response space. A weak PUF may have only one challenge-response pair. As an example, for a weak PUF implemented with a circuit, the challenge may be the powering on of the circuit, and the response may be a bit sequence represented by logic-valued voltages within the circuit. The response provided by a weak PUF can be used to identify the PUF for authentication purposes, or as another example the response can be used to generate a key to decrypt messages. The key may be the response itself, or a hash function can be applied to the response to generate the key.

The development of PUF circuits that are power and area efficient, and that exhibit good reliability and stability, is an area of active research.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DESCRIPTION OF EMBODIMENTS

In the description that follows, the scope of the term "some embodiments" is not to be so limited as to mean more than one embodiment, but rather, the scope may include one embodiment, more than one embodiment, or perhaps all embodiments.

Figure 1:
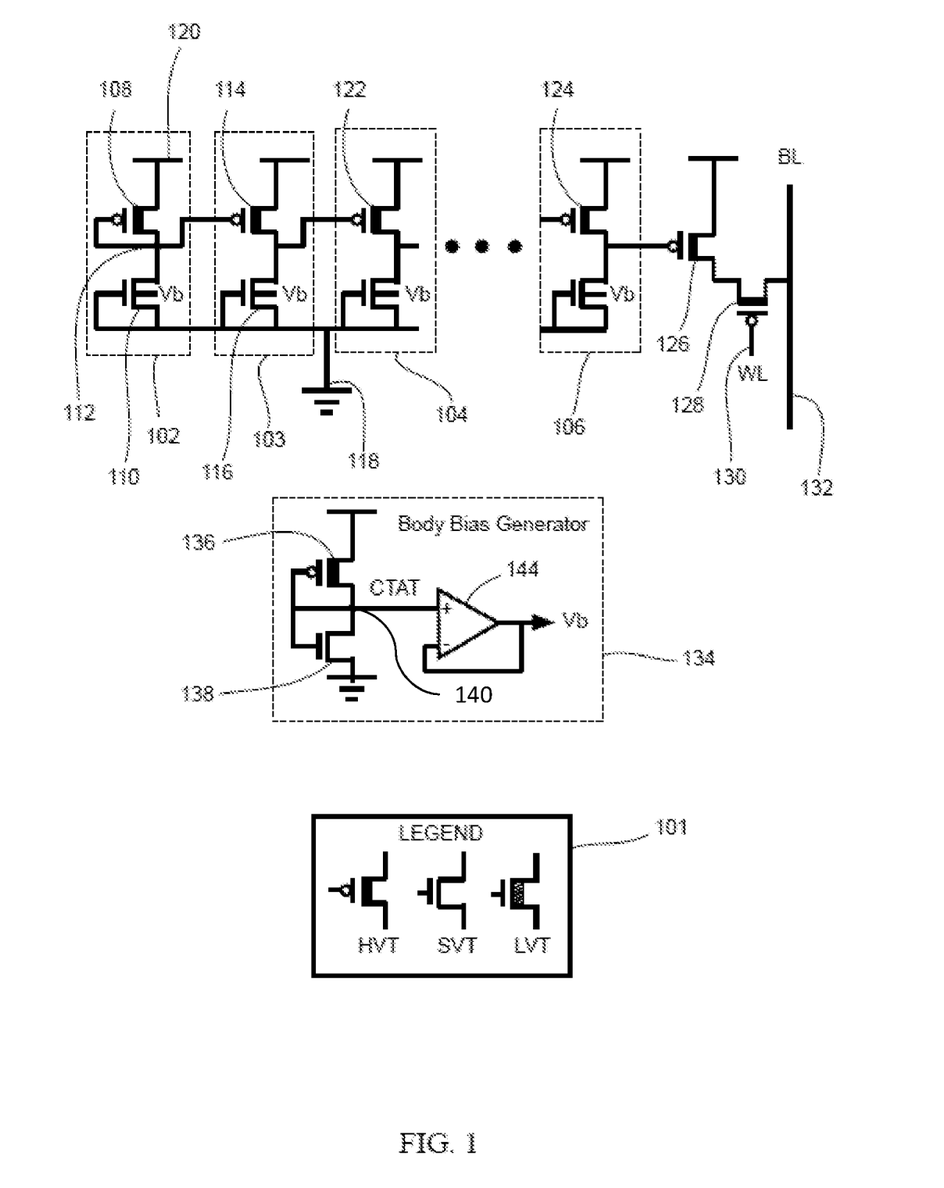
FIG. 1 illustrates an implementation of a PUF cell based on a two-transistor amplifier.

FIG. 1 illustrates a PUF cell comprising a voltage generator 102 followed by one or more amplifier stages. For ease of illustration, three amplifier stages are illustrated: a first amplifier stage 103, a second amplifier stage 104, and a last amplifier stage 106. Some embodiments may include less than or more than three amplifier stages. The voltage generator 102 and each amplifier stage comprise two transistors, and are based on a two-transistor amplifier design to be described in more detail. Each amplifier stage has the same circuit configuration.

The voltage generator 102 includes a pMOSFET 108 having a drain connected to the drain of an nMOSFET 110. The gate of the pMOSFET 108 is connected to its drain, as indicated by a node 112. The node 112 may be viewed as the output port of the voltage generator 102.

The amplifier stage 103 includes a pMOSFET 114 having a drain connected to the drain of an nMOSFET 116. The gate of the pMOSFET 114 may be viewed as the input port to the amplifier stage 103, and is connected to the node 112 (the output port) of the voltage generator 102. The gate of the nMOSFET 110 and the gate of the nMOSFET 116 are each connected to their respective sources and to a ground (or substrate) rail 118. The source of the pMOSFET 108 and the source of the pMOSFET 114 are each connected to a supply or power rail 120.

For each amplifier stage, the gate of its pMOSFET may be considered an input port and the drain of its pMOSFET may be considered an output port. The source of the pMOSFET in each amplifier stage is connected to the power rail 120. The nMOSFET in each amplifier stage has its gate connected to its source and connected to the ground rail 118. For each amplifier stage, the drains of its pMOSFET and nMOSFET are connected together.

In the particular example of FIG. 1, the output port of the amplifier stage 103 (the drain of the pMOSFET 114) is connected to the input port of the amplifier stage 104 (the gate of the pMOSFET 122). The input port of each amplifier stage (except for the first amplifier stage 103) is connected to the output port of the immediately preceding amplifier stage. The output port of the last amplifier stage 106 (the drain of a pMOSFET 124) may be considered the output port of the PUF cell.

As is well known in the art of circuit design, various circuits are available to read the output voltage of a PUF cell. In the particular example of FIG. 1, a buffer 126 is connected to the output port (the drain of the pMOSFET 124) of the amplifier stage 106, followed by a pMOSFET 128 with its gate connected to a wordline 130 and its source/drain terminal connected to a bitline 132. A sense amplifier (not illustrated in FIG. 1) can read the output voltage of the PUF cell on the bitline 132 when the wordline 128 is de-asserted. As is well known, various techniques may be used to pre-charge the bitline 132 before reading the output voltage of the PUF cell.

The nMOSFET in each amplifier stage has a gate-to-source voltage of zero, which sets a sub-threshold current. The two-transistor structure of an amplifier stage is easily recognized as a common-source amplifier (or follower) with pseudo-resistor loading (the nMOSFET). With a sub-threshold current, a relatively large transconductance gain $g_m$ can be realized. For example, a transconductance gain $g_m$ greater than 40 is easily realized for an amplifier stage, so that with the pseudo-resistance of the nMOSFET of an amplifier stage, a relatively large voltage gain can be achieved.

Observe that when considering an amplifier stage by itself, isolated from the other components making up a PUF cell, shorting its input port to its output port realizes the same structure as the voltage generator 102. In an embodiment, the ratio of the size of the pMOSFET 108 to the size of the nMOSFET 110 for the voltage generator 102 can match that of each amplifier stage. (Obviously any matching cannot be made exact, but the matching is designed to be as accurate as practical according to the available process technology used to fabricate the PUF cells.) In particular, the sizes of the pMOSFET and the nMOSFET in each amplifier stage can match, respectively, the pMOSFET 108 and the nMOSFET 110 in the voltage generator 102. Consequently, the output voltage of the voltage generator 102 can be designed to have the same value as the switching voltage of an amplifier stage.

If there were no manufacturing variations in fabricating MOSFETs, then for an amplifier stage matched to the voltage generator 102, or where the amplifier stage and the voltage generator 102 each have matched ratios of sizes for their respective pMOSFETs and nMOSFETs, then the output voltage of the amplifier stage would equal the output voltage of the voltage generator 102. However, because of inevitable manufacturing variations, there is some mismatch between the voltage generator 102 and an amplifier stage, and any such mismatch will induce a small difference in the output voltage of the voltage generator 102 and the switching voltage of the amplifier stage (i.e., the first amplifier stage 103). This difference in output and switching voltages is amplified by the relatively large voltage gain of the amplifier stage.

It is found that the output voltage of the voltage generator 102 and the switching voltage of an amplifier stage follow a normal (Gaussian) distribution. Therefore, the voltage difference due to mismatch between the voltage generator 102 and the amplifier stage 103 also follows a normal distribution. With enough amplifier stages, for example three, four, or more amplifier stages, the output voltage of the resulting chain of amplifier stages is amplified to essentially full rail, so that the output voltage of a PUF cell when powered on is either at the ground or substrate voltage $V_{SS}$ or at the power rail voltage $V_{DD}$. Because the sum or difference of random variables with a normal distribution is itself a random variable with a normal distribution, a PUF cell according to the embodiment of FIG. 1 has essentially nearly equal probabilities in providing a logical LOW ($V_{SS}$) or a logical HIGH ($V_{DD}$) as an output voltage when powered up. This is a desirable feature for a PUF cell.

The switching voltage of an amplifier stage, and the output voltage of the voltage generator 102, linearly (or nearly linearly) tracks the power rail voltage $V_{DD}$ and depends on the difference in threshold voltages between a pMOSFET and its corresponding nMOSFET, assuming that both the pMOSFET and the nMOSFET each have a drain-to-source voltage with a magnitude greater than about 200 mV, and assuming that any dependence of the sub-threshold drain current on the drain-to-source voltage can be ignored. The switching voltage of an amplifier stage and the output voltage of the voltage generator 102 vary across process corners and temperatures. However, the output voltage of a PUF cell is essentially not affected by such variations because the voltage generator 102 and each amplifier stage are in the same PVT (Process Voltage Temperature) conditions. Accordingly, if each drain-to-source voltage has a magnitude greater than about 200 mV so that variations in $V_{DD}$ do not appreciably affect the output voltage of the voltage generator 102 and the switching voltage of the amplifier stages, then for the most part only mismatches due to manufacturing variations affect the output voltage of a PUF cell. To help insure that the drain-to-source voltage of each pMOSFET and nMOSFET has a magnitude greater than about 200 mV, the threshold voltage of the nMOSFETs should be significantly less than the threshold voltage of the pMOSFETs. For example, for some embodiments the difference in values for the threshold voltage may be in magnitude about 200 mV. A typical threshold voltage value may be in magnitude about 500 mV.

In the particular embodiment of FIG. 1, the pMOSFETs are each a high threshold voltage (HVT) transistor as indicated in the legend 101. The nMOSFET 110 in the voltage generator 102, and the nMOSFET in each amplifier stage, is a standard threshold voltage (SVT) transistor as indicated in the legend 101. By forward body biasing the nMOSFET 110 and the nMOSFET in each amplifier stage, the threshold voltage the nMOSFETs can be made significantly less than the threshold voltage of the pMOSFETs. In FIG. 1, the forward body bias voltage is denoted as $V_b$. Various embodiments described herein may utilize a deep n-well process in the fabrication of the nMOSFETs.

A body bias generator 134 may be used to generate the forward body bias voltage. In the implementation of FIG. 1, the body bias generator 134 includes a voltage source comprising a pMOSFET 136 and an nMOSFET 138, where the gates and drains of the pMOSFET 136 and the nMOSFET 138 are connected to each other at a node 140, the source of the pMOSFET 136 is connected to the power rail 120, and the source of the nMOSFET 138 is connected to the ground rail 118. The pMOSFET 136 is an HVT transistor and the nMOSFET 138 is an SVT transistor. The node 140 may be viewed as an output port of an internal voltage generator comprising the pMOSFET 136 and the nMOSFET 138.

The node 140 provides a CTAT (Complementary To Absolute Temperature) voltage to a buffer 144, where an output port of the buffer 144 provides the forward body bias voltage $V_b$. The relative sizes of the pMOSFET 136 and the nMOSFET 138 may be adjusted to provide the desired bias voltage at the node 140.

Figure 2:
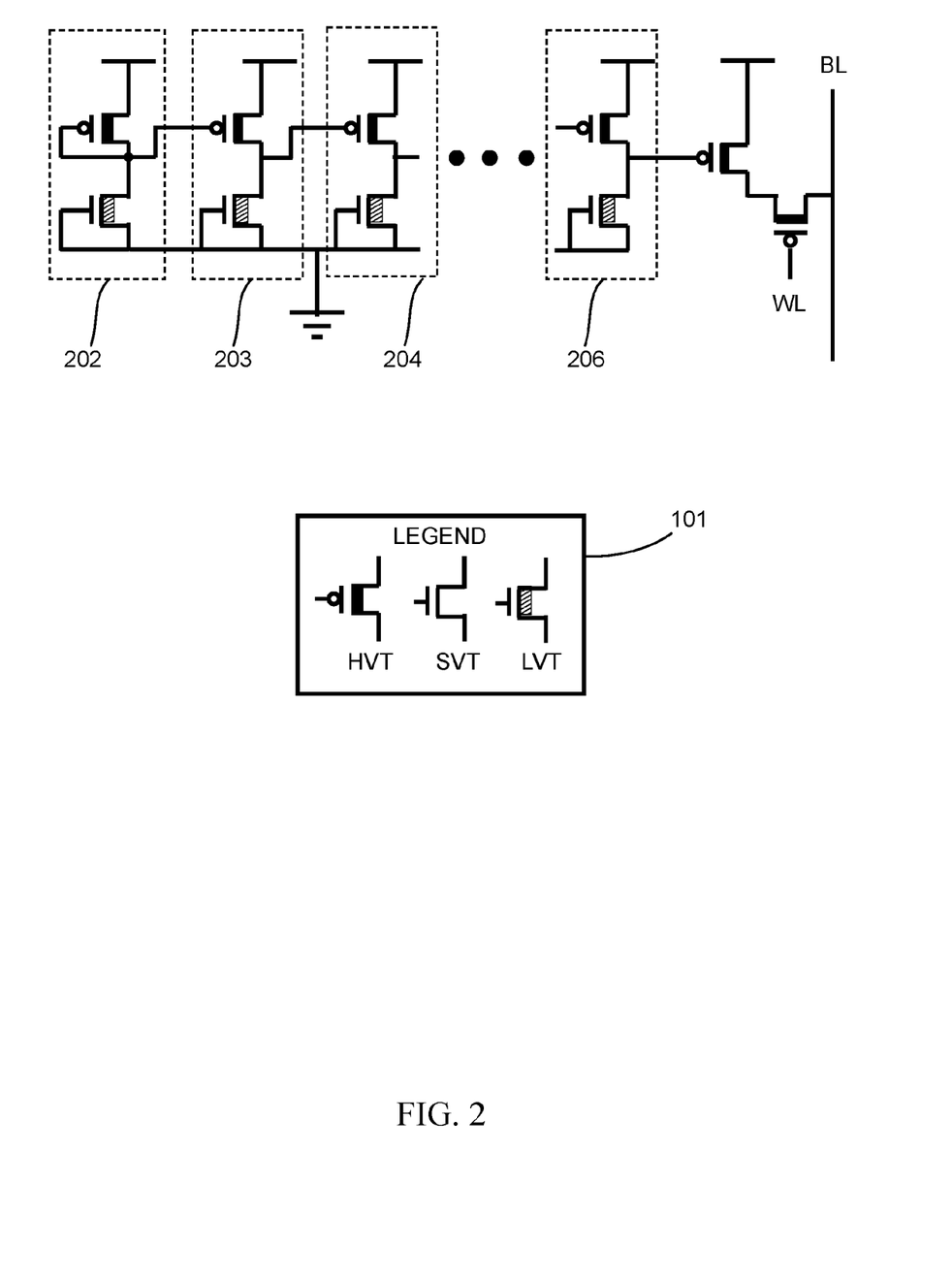
FIG. 2 illustrates another implementation of a PUF cell based on a two-transistor amplifier.

FIG. 2 illustrates another implementation of a PUF cell, comprising a voltage generator 202, followed by one or more amplifier stages. As in FIG. 1, for ease of illustration, three amplifier stages are illustrated: a first amplifier stage 203, a second amplifier stage 204, and a last amplifier stage 206, where an embodiment according to FIG. 2 may include less than or more than three amplifier stages.

The circuit structure illustrated in FIG. 2 is essentially the same as that of FIG. 1, and thus a detailed description of the PUF cell illustrated in FIG. 2 follows that of FIG. 1. However, instead of forward body biasing the nMOSFETs in the voltage generator 202 and in the amplifier stages, the nMOSFETs in the PUF cell of FIG. 2 are low threshold voltage (LVT) transistors to help ensure that the threshold voltage of the nMOSFETs can be made significantly less than the threshold voltage of the pMOSFETs. Furthermore, because forward body biasing is not used, the particular embodiment of FIG. 2 does not employ a deep n-well process, but this is not a requirement.

In practice, the PUF cell of FIG. 2 is larger than that of FIG. 1 due to design rules. Furthermore, in many instances it is found that the embodiment of FIG. 1 achieves slightly better stability when the body bias generator 134 provides a CTAT forward body bias voltage. It is also found that the body bias generator 134 can inherently compensate for global mismatch among the pMOSFETs and nMOSFETs, thereby resulting in a more stable switching voltage. This helps to ensure that the drain-to-source voltages have a magnitude greater than about 200 mV across various PVT conditions without calibration.

Figure 3:
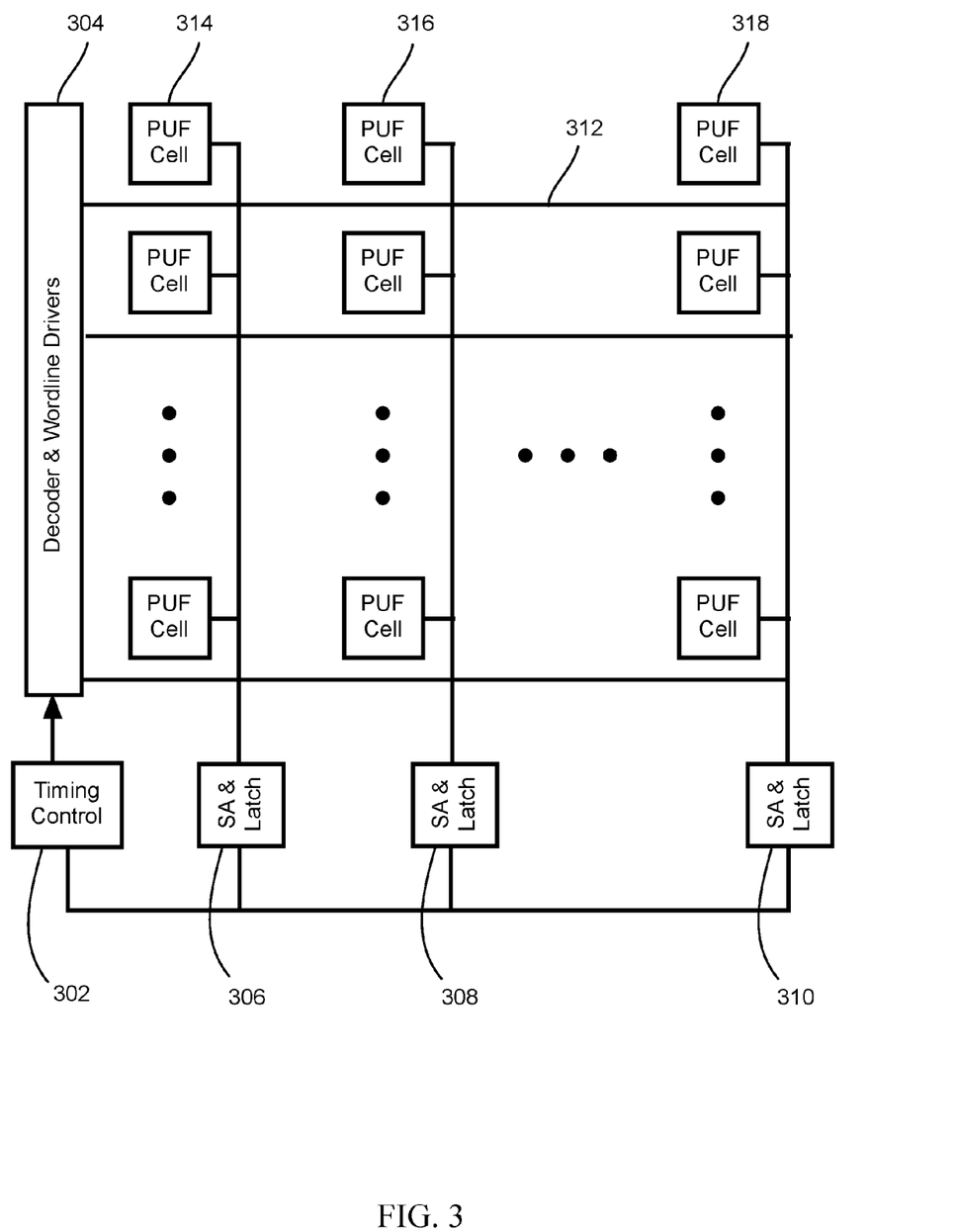
FIG. 3 illustrates an implementation of a crossbar array with the PUF cells of FIG. 1 or FIG. 2.

Because the PUF cells of FIGS. 1 and 2 employ amplifier stages having a relatively high voltage gain, there is improved stability with a reduction in complexity compared to prior art PUF cells employing shared amplifiers with noise and offset cancellation. Contributing to a reduction in complexity is that each amplifier stage and voltage generator for the embodiments of FIGS. 1 and 2 is based upon a simple two-transistor amplifier design. The reduced complexity facilitates arranging the PUF cells into a crossbar array as illustrated in FIG. 3. The embodiment of FIG. 3 can achieve efficiencies in chip area and energy dissipation compared to using scan chains or multiplexers to read PUF cell output voltages as in some prior art implementations. The crossbar configuration as illustrated in FIG. 3 also can leverage circuit techniques employed in SRAM (Static Random Access Memory) technology for reading the output voltages of the PUF cells.

FIG. 3 illustrates a PUF cell array, where the PUF cells are according to the embodiments of FIG. 1 or FIG. 2. The PUF cells are arranged into an array, where the bitlines and wordlines are orientated, respectively, vertically and horizontally with respect to the orientation of the drawing. A timing control unit 302 controls a decoder and wordline driver unit 304 so that wordlines may be de-asserted, one at a time, to read the response bits provided by the PUF cells. The responses are read off of the bitlines. The sense amplifier and latch units, of which three are explicitly shown (306, 308, and 310) read the response bits on the various bitlines and latch the sensed values to provide the response bits. The latched response bits may be processed by other logic circuits (not shown) so that a chip utilizing the PUF cell array may be authenticated, or the response bits may be used to develop a key for encryption or decryption.

The PUF cell array of FIG. 3 may be used to provide multiple responses, depending upon which wordline is de-asserted. For example, when de-asserting the wordline 312, the sense amplifier and latch units read response bits from the PUF cells addressed by the de-asserted wordline, of which three are explicitly shown in FIG. 3: the PUF cell 314, the PUF cell 316, and the PUF cell 318. The circuits for realizing the decoder and wordline driver unit 304 to address a particular row of PUF cells, and the circuits for the sense amplifier and latch units, are similar to well-known circuits used in SRAM memory arrays. Temporal majority voting may be employed whereby the same wordline is de-asserted multiple times, and where the response bits are averaged over time.

Figure 4:
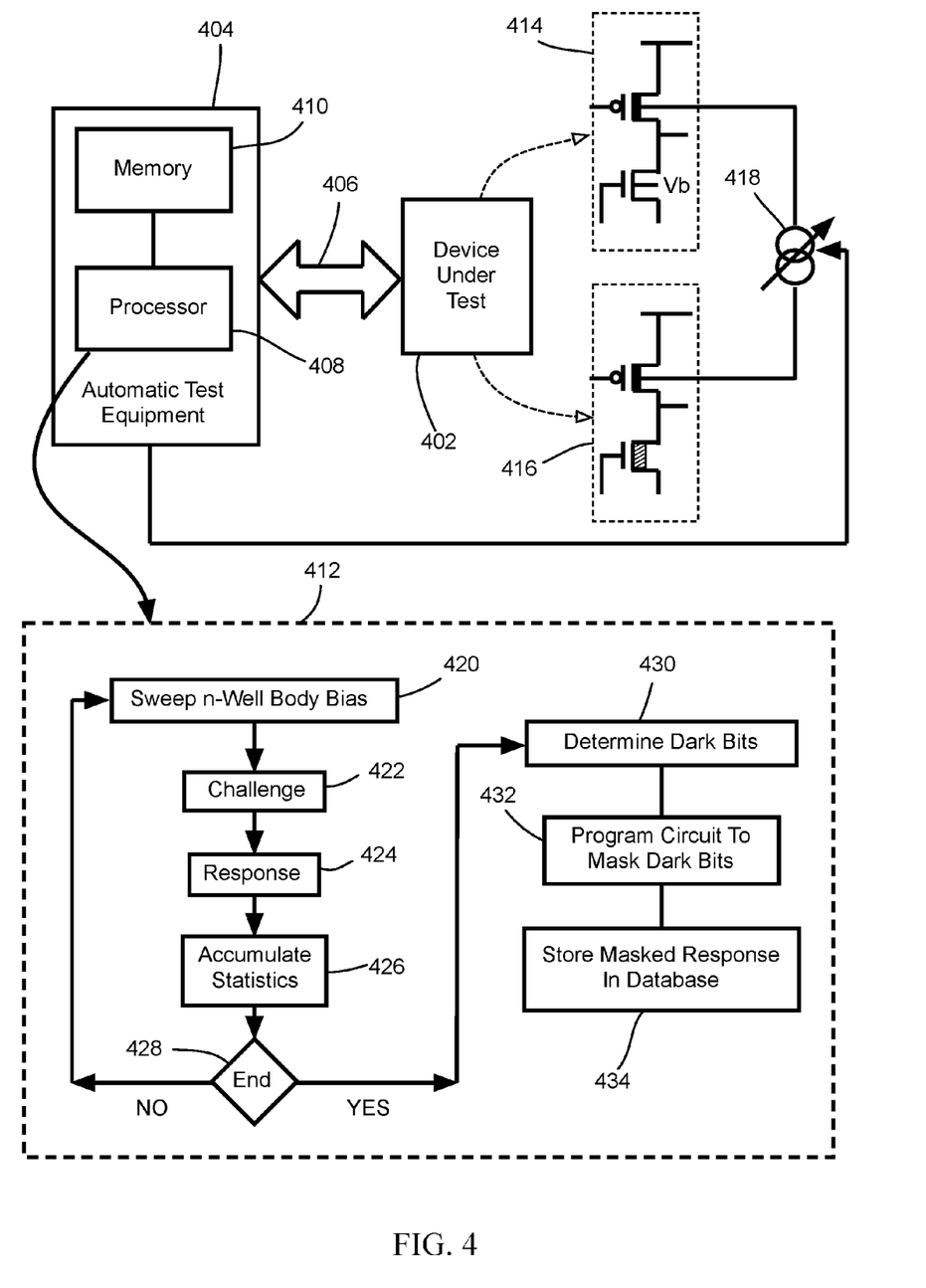
FIG. 4 illustrates an apparatus and method for efficiently generating a dark bit mask for PUF cells.

In practice, there may be some PUF cells that due to manufacturing faults may not provide a response bit in a reliable or stable fashion. Masking is an efficient way to filter out such unreliable or unstable response bits, commonly referred to as dark bits. FIG. 4 illustrates an apparatus and method for efficiently developing a mask by which dark bits may be filtered out.

A device under test 402 represents the chip or chips containing the PUF cells that are to be tested. In practice, the chips under test may not yet have been diced from the wafer in which they have been fabricated, but it is convenient to refer to a chip in a wafer being tested as a chip under test even if dicing of the wafer has not yet been performed.

The device under test 402 is coupled to an automatic test equipment 404 by way of a test interface 406. The automatic test equipment 404 includes a processor 408 and a memory 410. The processor 408 may represent one or more processors, were each processor may include one or more processing cores, and the memory 410 may represent a memory hierarchy. The memory 410 may store instructions that when executed on the processor 408 run part or all of a process 412. The process 412 may represent multiple processes running on the processor 408. Some or all of the steps represented by the process 412 may be hardwired into a special application circuit within the automatic test equipment 404.

The PUF cells in the device under test 402 may include the embodiment of FIG. 1, as represented by a two-transistor amplifier 414, or the embodiment of FIG. 2, as represented by a two-transistor amplifier 416. The two-transistor amplifier 414 represents the voltage generator 102 and the amplifiers stages (e.g., 103, 104, and 106) of FIG. 1. Likewise, the two-transistor amplifier 416 represents the voltage generator 202 and the amplifier stages (e.g., 203, 204, and 206) of FIG. 2.

A voltage source 418 provides a variable body bias voltage to the body or n-well of the pMOSFET of the two-transistor amplifier 414, or to the body or n-well of the pMOSFET of the two-transistor amplifier 416. The automatic test equipment 404 may control the voltage source 418 by way of the test interface 406. In standard operation when used in the field, the body of the pMOSFETs in a PUF cell are connected to a constant voltage source, such as the power rail 120. However, as discussed with respect to the process 412, during testing the pMOSFET body bias voltage is varied to provide efficient detection of any dark bits.

Referring to the process 412, in step 420 the voltage source 418 is controlled so that various body bias voltages are applied to the body of the pMOSFETs of the device under test 402. For example, over some time interval the body bias voltage may be swept over a range of values. It is not necessary to vary the temperature, and sweeping the body bias voltage over some range of values may be performed at room temperature. At each selected body bias voltage, in step 422 a challenge is provided to the PUF cells in the chip under test, where the PUF cells provide response bits in a step 424. The challenge indicated in the step 422 may be simply that the chip under test is powered up.

In step 426, the values of the response bits are accumulated for various values of the body bias voltage. This process continues in a loop as indicated by the NO branch of decision step 428. Over time, the values of the response bits for each chip under test is accumulated as the body bias voltage is swept over some range. When this particular part of the process 412 ends as indicated by the YES branch of the decision step 428, a determination is made as to those response bits that are unreliable or unstable, as indicated in a step 430.

The determination made in step 430 may be based upon comparing the number of flips of a response bit to some threshold, where if the number of flips for a response bit is greater than the threshold, then the response bit is determined to be a dark bit. That is, the PUF cell that provided the dark bit is determined to be unstable or unreliable. When the dark bits are determined in step 430, then in step 432 the automatic test equipment 404 programs the chip under test to store a mask for the dark bits. This programming may involve blowing various fuses in the chip under test, or programming nonvolatile memory in the chip under test to store the mask, such as for example erasable programmable read-only memory (EEPROM). The programming may be performed by way of the test interface 406. In standard operation in the field, the mask indicates which PUC cells should have their output voltages masked out so that dark bits are not part of a response to a challenge. The mask need not be implemented as a physically unclonable function.

The masked response (the response bits that are not dark bits) for a chip under test is stored and associated with the chip under test, as indicated in a step 434. (The step 432 need not be performed before the step 434.) For example, a chip ID (Identification) of the chip under test may be paired with its masked response and stored in a database. The chip manufacturer can make available the pairs of chip ID and masked response bits to a trusted third party so that the chip under test, when eventually part of a useable device, may be authenticated or used to generate a secret key. For example, for digital rights management (DRM), a chip ID may indicate to a third party that the chip ID is registered for some subscription level, where a key in the chip is generated to decrypt an encrypted file according to the subscription level.

As discussed previously, the PUF cells in the embodiment of FIG. 4 are based upon the two-transistor amplifier 414 or the two-transistor amplifier 416. However, other embodiments may be realized that are similar to that of FIG. 4, but where the PUF cells are CMOS circuits of a different design. In such other embodiments, the voltage source 418 would also be used to bias various n-wells of the PUF cells, and the process 412 would also be used to generate a dark bit mask.

Figure 5:
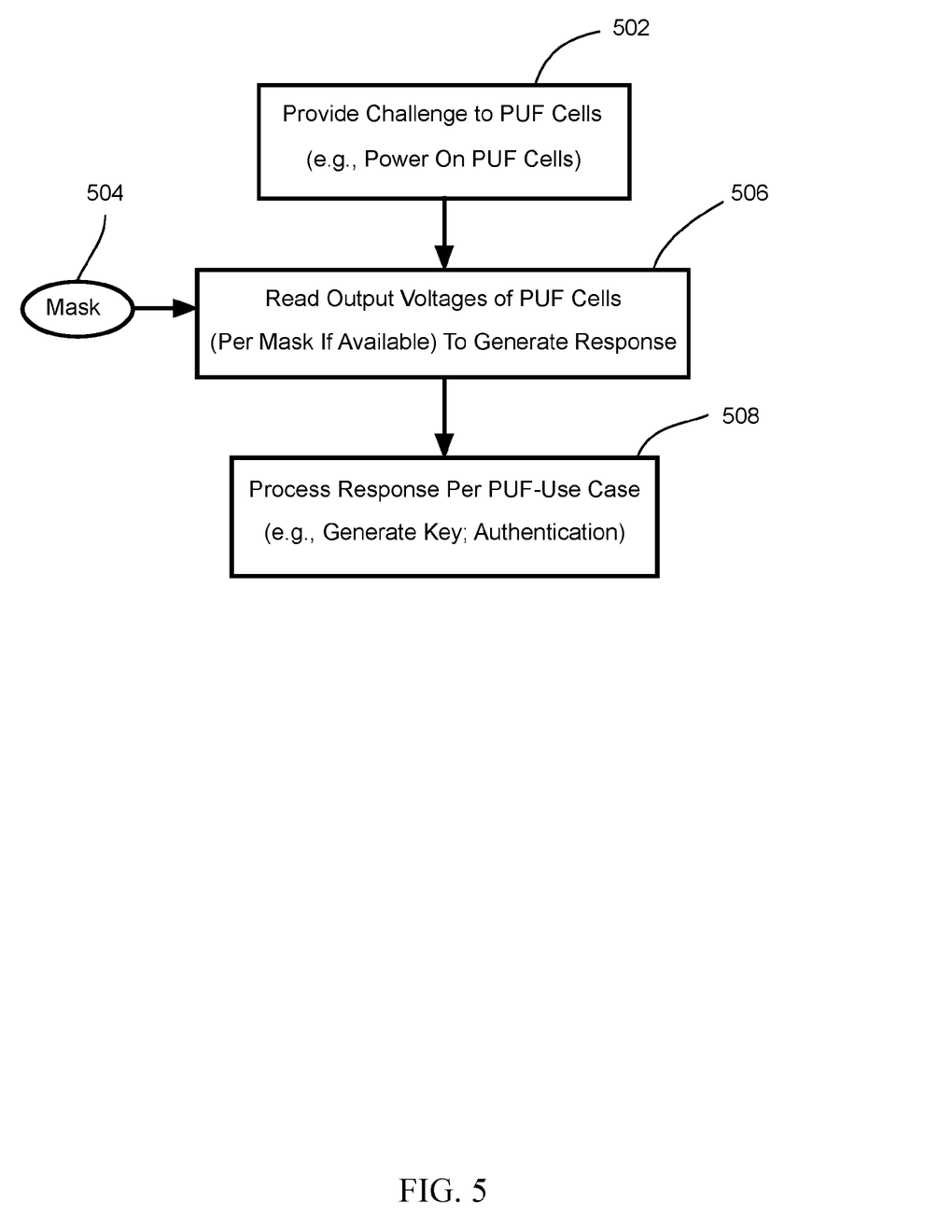
FIG. 5 illustrates a system-level implementation of the PUF cells of FIG. 1 or FIG. 2 to provide a response given a challenge.

FIG. 5 illustrates a system-level implementation of the PUF cells of FIG. 1 or FIG. 2 to provide a response when given a challenge. In step 502, a challenge is provided to the PUF cells. The challenge may be simply the powering on of the chip in which the PUF cells are embedded. In step 506, the output voltages of the PUF cells are read to generate a response, but if a mask is available as indicated in step 504, then the mask is used in the generation of the response so that the dark bits are not used. In step 508, the response is used according to a PUF-use case. For example, the response may be used for authentication, or the response may be processed to generate a key (which may be simply the response bits without processing).

Some of the embodiments disclosed herein make use of HVT, SVT, and LVT transistors. The fabrication of such transistors is well known in the art of semiconductor technology, and actual values of the various threshold voltages for HVT, SVT, and LVT transistors may depend upon the particular semiconductor process for fabricating the PUF cells. The terms HVT, SVT, and LVT are not necessarily standard terms. Practitioners in the art of semiconductor technology may use terms or designations other than HVT, SVT, and LVT. It is to be understood that referring to HVT, SVT, or LVT transistors is merely a convenient way to group transistors according to the relative values of their threshold voltages.

Implementations of various technologies described herein may be operational with numerous general purpose or special purpose computing system environments or configurations. Examples of computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Program modules include routines, programs, objects, components, data structures, etc. that perform particular tasks or implement particular abstract data types. Further, each program module may be implemented in its own way, and all need not be implemented the same way. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or some combination of both.

The various technologies described herein may be implemented in distributed computing environments where tasks are performed by remote processing devices that are linked through a communications network, e.g., by hardwired links, wireless links, or various combinations thereof. In a distributed computing environment, program modules may be located in both local and remote computer storage media including, for example, memory storage devices and similar.

Further, the discussion provided herein may be considered directed to certain specific implementations. It should be understood that the discussion provided herein is provided for the purpose of enabling a person with ordinary skill in the art to make and use any subject matter defined herein by the subject matter of the claims. It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Described herein are various implementations of an integrated circuit having a power rail, a ground rail, a voltage generator, and an amplifier stage. The voltage generator includes a node, a pMOSFET having a source connected to the power rail, a gate connected to the node, and a drain connected to the node. The voltage generator further includes an nMOSFET having a source connected to the ground rail, a gate connected to the ground rail, and a drain connected to the node. The amplifier stage includes a pMOSFET having a source connected to the power rail, a gate connected to the node, and a drain. The amplifier stage further includes an nMOSFET having a source connected to the ground rail, a gate connected to ground rail, and a drain connected to the drain of the pMOSFET of the amplifier stage.

Described herein are various implementations of a method, where the method includes varying a body bias voltage applied to n-wells of a set of PUF cells in a circuit, where the set of PUF cells provides response bits to a challenge. The method further includes, for each PUF cell, accumulating a number of flips in the response bit for said each PUF cell as the body bias voltage is varied.

Described herein are various implementations of a method, where the method includes providing a challenge to a set of PUF cells in a circuit, and reading output voltages of the set of PUF cells to generate a response for the challenge, where the response is masked if a mask has been programmed in the circuit. For the method, the circuit comprises a power rail and a ground rail, wherein each PUF cell in the set of PUF cells includes a voltage generator and an amplifier stage. The voltage generator includes a node, a pMOSFET having a source connected to the power rail, a gate connected to the node, and a drain connected to the node. The voltage generator further includes an nMOSFET having a source connected to the ground rail, a gate connected to the ground rail, and a drain connected to the node. The amplifier stage includes a pMOSFET having a source connected to the power rail, a gate connected to the node, and a drain. The amplifier stage further includes an nMOSFET having a source connected to the ground rail, a gate connected to ground rail, and a drain connected to the drain of the pMOSFET of the amplifier stage.

Reference has been made in detail to various implementations, examples of which are illustrated in the accompanying drawings and Figures. Numerous specific details are set forth to provide a thorough understanding of the disclosure provided herein. However, the disclosure provided herein may be practiced without these specific details. In some other instances, well-known methods, procedures, components, circuits, and networks have not been described in detail so as not to unnecessarily obscure details of the embodiments.

If one or more circuits are used to realize some or all instances of an embodiment, reference may be made to a node or terminal of a circuit or circuit element as an input port or an output port. For a circuit in which a port is a two terminal structure (e.g., circuits modeled as lumped-parameter systems), a recited node or terminal forms one terminal of the two terminal structure, where it is understood that a ground rail (or substrate) serves as another terminal of the two terminal structure.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described herein are disclosed as example forms of implementing the claims.

What is claimed is:

1. A circuit comprising:
   a power rail;
   a ground rail;
   a voltage generator comprising:
      a node;
      a pMOSFET (Metal Oxide Semiconductor Field Effect Transistor) having a source connected to the power rail, a gate connected to the node, and a drain connected to the node; and
      an nMOSFET having a source connected to the ground rail, a gate connected to the ground rail, and a drain connected to the node; and
   an amplifier stage comprising:
      a pMOSFET having a source connected to the power rail, a gate connected to the node, and a drain; and
      an nMOSFET having a source connected to the ground rail, a gate connected to ground rail, and a drain connected to the drain of the pMOSFET of the amplifier stage.

2. The circuit as set forth in claim 1, wherein
   a ratio of sizes of the pMOSFET of the voltage generator to the nMOSFET of the voltage generator matches a ratio of sizes of the pMOSFET of the amplifier stage to the nMOSFET of the amplifier stage.

3. The circuit as set forth in claim 2, further comprising:
   a body bias generator to forward body bias the nMOSFETs of the voltage generator and the amplifier stage.

4. The circuit as set forth in claim 3, wherein the body bias generator provides a Complementary To Absolute Temperature bias voltage.

5. The circuit as set forth in claim 3, wherein a difference in threshold voltages between each said pMOSFET and each said nMOSFET is in magnitude from 200 mV to 700 mV.

6. The circuit as set forth in claim 2, wherein a difference in threshold voltages between each said pMOSFET and each said nMOSFET is in magnitude from 200 mV to 700 mV.

7. The circuit as set forth in claim 1, wherein
   the voltage generator is matched to the amplifier stage.

8. The circuit as set forth in claim 7, further comprising:
   a body bias generator to forward body bias the nMOSFETs of the voltage generator and the amplifier stage.

9. The circuit as set forth in claim 8, wherein the body bias generator provides a Complementary To Absolute Temperature bias voltage.

10. The circuit as set forth in claim 8, wherein a difference in threshold voltages between each pMOSFET and each nMOSFET is in magnitude from 200 mV to 700 mV.

11. The circuit as set forth in claim 7, wherein a difference in threshold voltages between each said pMOSFET and each said nMOSFET is in magnitude from 200 mV to 700 mV.

12. The circuit as set forth in claim 1, further comprising:
    a second amplifier stage comprising a pMOSFET having a source connected to the power rail, a gate connected to the drain of the pMOSFET of the amplifier stage, and a drain; and an nMOSFET having a source connected to the ground rail, a gate connected to ground rail, and a drain connected to the drain of the pMOSFET of the second amplifier stage.

13. The circuit as set forth in claim 12, wherein
a ratio of sizes of the pMOSFET of the voltage generator to the nMOSFET of the voltage generator matches a ratio of sizes of the pMOSFET of the amplifier stage to the nMOSFET of the amplifier stage, and matches a ratio of sizes of the pMOSFET of the second amplifier stage to the nMOSFET of the second amplifier stage.

14. The circuit as set forth in claim 12, wherein
the voltage generator, the amplifier stage, and the second amplifier stage are matched to each other.

15. A method comprising:
varying a body bias voltage applied to n-wells of a set of PUF (Physically Unclonable Function) cells in a circuit, the set of PUF cells providing response bits to a challenge; and for each PUF cell, accumulating a number of flips in the response bit for said each PUF cell as the body bias voltage is varied.

16. The method as set forth in claim 15, further comprising:

for each PUF cell, setting a mask bit associated with said each PUF cell to indicate a dark bit, provided the accumulated number of flips in the response bit for said each PUF cell exceeds a threshold.

17. The method as set forth in claim 16, the circuit comprising a power rail and a ground rail, wherein each PUF cell comprises:

a voltage generator comprising
  a node;
  a pMOSFET (Metal Oxide Semiconductor Field Effect Transistor) having a source connected to the power rail, a gate connected to the node, and a drain connected to the node; and
  an nMOSFET having a source connected to the ground rail, a gate connected to the ground rail, and a drain connected to the node; and an amplifier stage comprising
  a pMOSFET having source connected to the power rail, a gate connected to the node, and a drain; and
  an nMOSFET having a source connected to the ground rail, a gate connected to ground rail, and a drain connected to the drain of the pMOSFET of the amplifier stage.

18. A method comprising:
providing a challenge to a set of PUF (Physically Unclonable Function) cells in a circuit; and reading output voltages of the set of PUF cells to generate a response for the challenge, wherein the response is masked if a mask has been programmed in the circuit;

wherein the circuit comprises a power rail and a ground rail, wherein each PUF cell in the set of PUF cells comprises:

a voltage generator comprising
  a node;
  a pMOSFET (Metal Oxide Semiconductor Field Effect Transistor) having a source connected to the power rail, a gate connected to the node, and a drain connected to the node; and
  an nMOSFET having a source connected to the ground rail, a gate connected to the ground rail, and a drain connected to the node; and an amplifier stage comprising
  a pMOSFET having a source connected to the power rail, a gate connected to the node, and a drain; and
  an nMOSFET having a source connected to the ground rail, a gate connected to ground rail, and a drain connected to the drain of the pMOSFET of the amplifier stage.

19. The method as set forth in claim 18, further comprising:

processing the response according to a PUF-use case.

20. The method as set forth in claim 18, wherein the challenge comprises powering on the circuit.

* * * * *